US005221386A

United States Patent [19]

[11] Patent Number: 5,221,386

Ensminger et al.

[45] Date of Patent: Jun. 22, 1993

[54] CEMENT BOARD HAVING REINFORCED EDGES

[75] Inventors: Robert P. Ensminger, Carman; Robert E. McCleary, Geneva; Ludwig Wenzlow-Lukasch, Deerfield, all of Ill.

[73] Assignee: United States Gypsum Company, Chicago, Ill.

[21] Appl. No.: 335,020

[22] Filed: Apr. 7, 1989

Related U.S. Application Data

[62] Division of Ser. No. 831,706, Feb. 20, 1986, abandoned.

[51] Int. Cl.[5] .................... B32B 3/18

[52] U.S. Cl. .................... 156/40; 156/42; 156/348

[58] Field of Search .................... 156/39, 40, 42, 348

[56] References Cited

U.S. PATENT DOCUMENTS

| | | | |
|---|---|---|---|
| 1,787,163 | 12/1930 | New | 156/40 |
| 1,808,003 | 6/1931 | New | 156/40 |
| 2,035,495 | 3/1936 | Mills | 156/348 |
| 3,373,065 | 3/1968 | Gutzman et al. | 156/40 |
| 3,578,517 | 5/1971 | Lapp et al. | 156/40 |
| 4,187,275 | 2/1980 | Bracalielly et al. | 156/40 |
| 4,203,788 | 5/1980 | Clear | 156/39 |
| 4,450,022 | 5/1984 | Galer | 156/42 |
| 4,488,917 | 12/1984 | Porter et al. | 156/39 |
| 4,504,335 | 3/1985 | Galer | 156/42 |
| 4,810,569 | 3/1989 | Lehnert et al. | 156/42 |

*Primary Examiner*—Peter Chin

*Attorney, Agent, or Firm*—Robert H. Robinson; John M. Lorenzen

[57] ABSTRACT

A cement board having bare surfaces and a woven mesh of reinforcing fibers underlying the top, bottom, and longitudinal edge surfaces is made continuously on an improved apparatus which comprises a pair of edger rails which slidably rest on a conveyor belt and define the path of the cement board being made on the conveyor belt and a means for folding and pressing outer margins of the bottom mesh into the edge surfaces and the top surface.

14 Claims, 4 Drawing Sheets

CEMENT BOARD HAVING REINFORCED EDGES

This is a continuation of co-pending application Ser. No. 831,706 filed on Feb. 20, 1986, now abandoned.

This invention relates to the continuous production of a reinforced cementitious panel. More particularly, it relates to a method and an apparatus for casting a cementitious slurry in the form of a thin, indefinitely long panel whose faces and longitudinal edges are reinforced by a network of fibers which is submerged-just below the cementitious surface. Still more particularly, this invention relates to a bare cement board whose faces and longitudinal edges are reinforced by a sub-surface network of fibers.

Cement board, a thin, reinforced concrete panel, has become increasingly popular during the past two decades as a durable substrate for ceramic tile in bath rooms, shower rooms, and other areas where the walls are subject to frequent splashing of water and high humidity. There is a growing interest in the use of cement boards on the exterior of buildings as in the construction of curtain walls. Having such uses, a covering for the surface of the concrete is neither needed nor desired. Because the boards are often attached at the margins to the building framework with nails or screws, however, it is highly desirable that the longitudinal edges of the boards be fully and uniformly filled and that they be reinforced at last as well as the faces of the boards. The border regions of the faces adjacent to the edges must not be thicker than the field regions thereof lest the wall turn out to be wavy rather than flat.

Reinforced panels having cores formed of a cementitious composition are presently known. U.S. Pat. No. 1,439,954 discloses a wallboard having a core of gypsum or Portland cement and a mesh material such as cotton gauze, wire cloth, perforated paper or perforated cloth applied to both faces of the core while the cementitious material is still in the plastic state.

U.S. Pat. No. 3,284,980 (Dinkel) discloses a pre-cast, lightweight concrete panel having a cellular core, a thin, high density layer on each face, and a layer of fiber mesh embedded in each of the high density layers. Each panel is case separately in forms in a step-wise procedure beginning with a thin layer of dense concrete mix, laying the mesh thereupon, pouring the lightweight concrete mix over the mesh to form the core, laying a second layer of mesh over the core mix, and pouring another layer of dense concrete mix over the second mesh layer.

Clear, in U.S. Pat. No. 4,203,799, discloses a continuous method for the production of the panels disclosed by Dinkel. In said method, a continuous web of glass fiber mesh is passed through a cementitious slurry, the slurry-laden mesh is laid on a plurality of moving carrier sheets, a lightweight concrete mix is deposited on the mesh as it moves along with the carrier sheets, a second continuous web of mesh is passed through a cementitious slurry and laid over the lightweight concrete core mix. The elongated sheet of concrete travels to a cutter station where the sheet is cut into individual panels.

Schupack, in U.S. Pat. No. 4,159,361, discloses a cold formable cementitious panel in which fabric reinforcing layers are encapsulated by the cementitious core. The layers of reinforcing fabric and cementitious material of the Schupack panel are laid and deposited on a vibrating forming table from a fabrication train which reciprocates longitudinally over the table. The cementitious core mix is smoothed by a laterally oscillating screed.

British Patent Application No. 2 053 779 A discloses a method for the continuous production of a building board which comprises advancing a pervious fabric on a lower support surface, depositing a slurry of cementitious material such as gypsum plaster on said advancing fabric, contacting the exposed face of the slurry with a second fabric, passing the fabric faced slurry under a second support surface, and advancing the fabric faced slurry between the two support surfaces while vibrating said surfaces. The vibration is said to cause the slurry to penetrate through the fabric to form a thin, continuous film on the outer faces of the fabric.

The problem common to all methods of production of fiber mesh reinforced cementitious panels is the forming and reinforcing of smooth uniform longitudinal edges. Schupack teaches the utilization of more tightly woven reinforcing fabric at the margins of the panel but the fabric does not wrap around upright edges of the panel. The problem is particularly difficult when the economies of continuous production are desired. Glass fiber mesh, the reinforcing fabric of choice in most instances, is bent easily but its resiliency causes it to spring back to its original shape when the bending force is removed.

In a method for the continuous production of a fiber reinforced cement board, Galer teaches in U.S. Pat. No. 4,450,022 that the edges of a moving carrier sheet are bent upright as a concrete mix is directed onto a fiber network carried by the carrier sheet. The trough-like sheet thus becomes a form for the continuous ribbon of concrete. After the mix is spread across and under the lower network and a second network is submerged in the upper surface of the mix, the upright edges of the carrier sheet are turned onto the upper surface. The fiber networks are, however, not wrapped around the edges of the cement board. Consistently uniform filling of the edge portions of the cement board has remained a problem until the time of the invention disclosed and claimed in this application even when the improved method of concrete mix distribution taught by Galer in U.S. Pat. No. 4,504,335 is employed. Trimming of the irregular edges has been necessary to have a commercially acceptable product.

Altenhöfer et al, in U.S. Pat. No. 4,504,533, points to difficulties that are encountered in making a gypsum board in which a first composite web of an impermeable non-woven fiberglass felt and a woven fiberglass mat covers the lower face of the gypsum core and is wrapped around the longitudinal edges of the gypsum core so that the border regions of the composite web lie on the upper face of the core. The extension of both the non-woven felt and the fiberglass mat, as a composite web, around the longitudinal edges causes problems in the scoring of the composite web which is necessary for the wrapping around and folding process. Further problems arise when a second composite web, placed on the upper surface of the board and overlapping the borders of the first composite web, is adhesively bonded to the first web. Ridges and undulations form on the overlapping border regions, according to Altenhöfer et al. These are said to be undesirable because they cause poor adhesion and detract from the desired smooth surface of the gypsum board. To solve the problems, Altenhöfer et al teaches the use of composite webs in which the fiberglass mat component is absent from the longitudinal border regions. In the use of such a composite on the lower face of the gypsum core only the layer of non-woven felt needs to be scored, folded, and wrapped around. Cutting away the mat from the border regions of the upper composite web permits improved adhesive bonding between the upper and lower webs. The product is a gypsum board having a woven fiberglass mat embedded in the upper and lower faces of the core and a non-woven fiberglass felt extending across the lower face, around the longitudinal edges, and partially inward from the edges while the upper face is covered by another non-woven felt which is glued to the folded-in lower felt.

Thus, there still remains a need for a bare cement board fully reinforced by a submerged network of fibers under both faces and both longitudinal edges, said edges being uniform and smoothly surfaced and said board having a substantially uniform thickness.

It is an object of this invention, therefore, to provide a flat, bare cement board having smooth, uniform longitudinal edges which are reinforced by a woven mesh of glass fibers immediately below the edge surfaces.

It is a related object of this invention to provide a bare cement board having a woven mesh of glass fibers immediately below each face thereof, the mesh in one face continuing under the surface of both longitudinal edges, with the option of having the two meshes in an abutting or an overlapping relation along the longitudinal margins of the opposite face.

It is another related object of this invention to provide a cement board having reinforcing woven glass fibers embedded in the faces and longitudinal edges thereof and whose marginal regions along said edges do not protrude above the plane of the field of the board.

It is another object of this invention to provide such a cement board having longitudinal marginal regions which taper slightly on one face.

It is another object of this invention to provide a method for continuously forming smooth, uniform and reinforced longitudinal edges on a cement board.

It is yet another object of this invention to provide an apparatus for forming such longitudinal edges on a cement board.

It is a further object of this invention to provide a bare cement board having a significantly stronger longitudinal edge so that the board will have an increased resistance to shattering when nailed along the margin to the framework of a building.

It is a still further object of this invention to provide a cost-saving method for continuously producing a cement board having fully formed uniform edges.

These and other objects of this invention which will become apparent from the attached drawings and the following description are achieved by:

- continuously towing on an endless conveyor belt an indefinitely long, non-adherent carrier sheet over a forming table which is upstream from the conveyor belt, said sheet being wider than the cement board being made;
- forming a continuous trough by bending outer portions of the sheet upright;
- continuously laying an indefinitely long woven mesh of glass fibers into the trough, the mesh being wider than the trough;
- continuously depositing a concrete mix on the mesh and distributing the mix laterally to fill the trough to a substantially uniform depth;
- towing the concrete filled trough in an abutting relationship with and between a pair of fixedly spaced apart, indefinitely long edger rails which rest longitudinally on the conveyor belt in slidable engagement therewith;
- folding upright portions of the carrier sheet and outer portions of the mesh inward and over the mix; and
- pressing the folded-over carrier sheet down onto the surface of the concrete mix and the woven mesh into the mix and increasing the pressing force as the carrier sheet travels downstream.

The aforementioned U.S. Pat. Nos. 4,450,022 and 4,504,335, as well as U.S. Pat. No. 4,488,909, are incorporated herein by reference. The '022 patent describes an apparatus and a method for creating a gap between the carrier sheet and the bottom mesh as they move over a forming table so that the concrete mix can penetrate the voids of the mesh and form a layer of concrete between the sheet and the mesh. The '335 patent describes a method for submerging a woven glass fiber mesh in the top surface of the concrete mix while the mix is moving over the forming table; the mesh is towed into the nip between the advancing mix and a cylindrical screeding roller which rotates counter to the direction of travel of the mix so that the roller presses the mesh into the surface of the mix and cleans itself of adhering mix by wiping the mix onto the upper surface of the mesh and into the voids thereof. The '909 patent describes a concrete mix which is preferred for the high speed continuous production of the cement board of this invention.

For a ready understanding of the apparatus and method used in the production of the cement board of this invention, they are illustrated in the attached drawings and described herein in association with portions of the production line described in the '022 and '335 patents.

Turning now to the drawings.

Figures 1, 2:
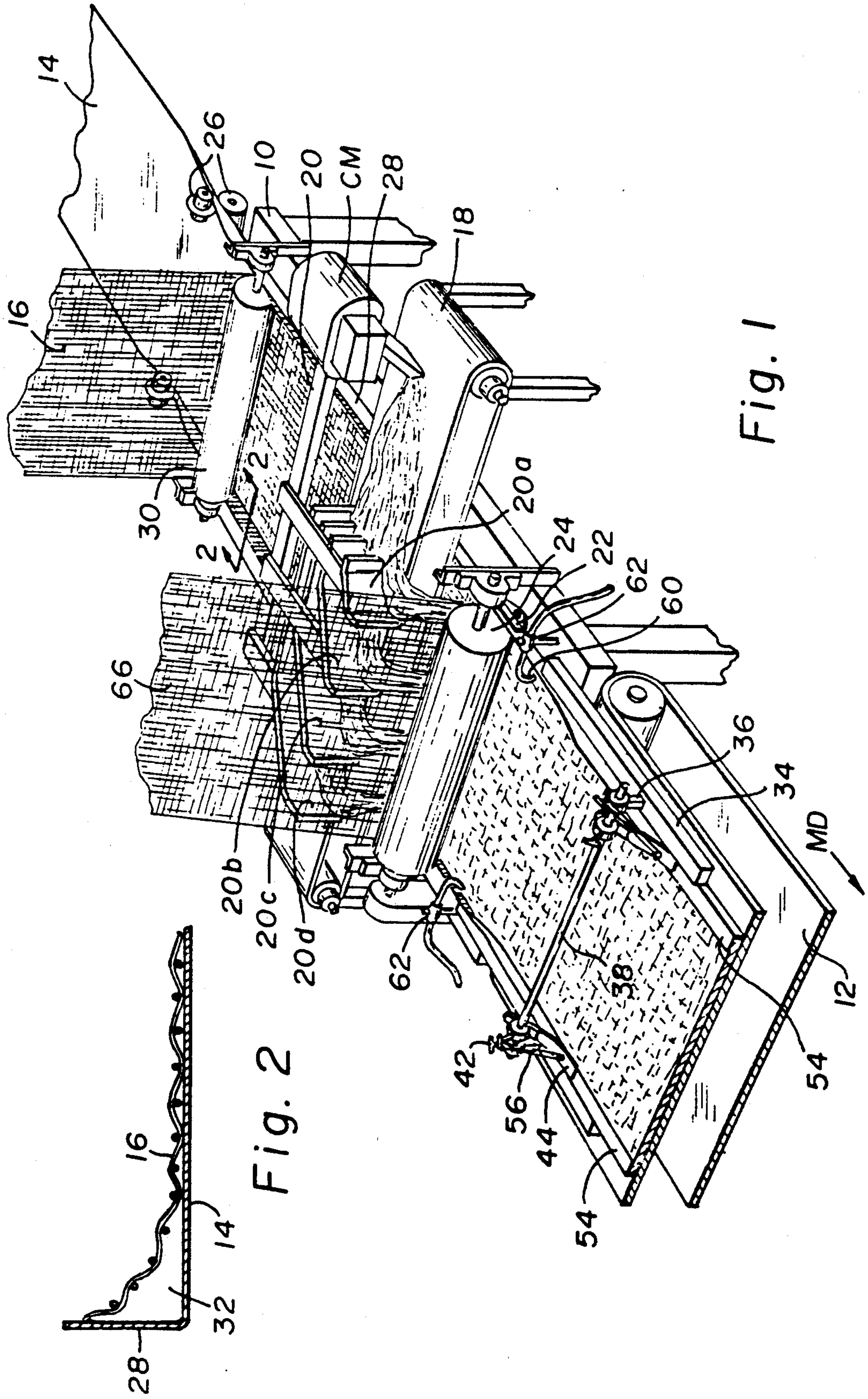
FIG. 1 is a fragmentary perspective view of the forming end of a cement board production line employing the apparatus of the invention.
FIG. 2 is a sectional view of the production line taken along line 2—2 of FIG. 1.

In FIG. 1, the forming table 10 and the conveyor belt 12 constitute the support for the carrier sheet 14 and the woven glass fiber mesh 16. Mounted transversely above the forming table 10 are the mortar distribution belt 18 and the stationary plow 20 whose blades 20*a*, 20*b*, 20*c*, and 20*d* contact the surface of the distribution belt 18 in scraping relationship. The guide flanges 22 are mounted on the table 10 just upstream from the mortar screeding roller 24 which is adjustable up and down so that the nip between it and the carrier sheet 14 may be set to the desired thickness of the panel to be manufactured. The roller 24 is journalled and driven by conventional means not shown.

The carrier sheet 14 is wider than the cement board being formed so that the sheet may be made into a continuous trough. The creaser wheels 26 are optional; they may be used to score longitudinal lines along side each lateral margin of the carrier sheet 14 to facilitate the bending of the sheet to form the upright walls 28 as the sheet is towed between the guide flanges 22. The mesh 16 is also wider than the desired board and, therefore, wider than the trough formed by the bent carrier sheet; it may be of the same or narrower width as the flat carrier sheet but not wider. The mesh 16 is fed into the trough under the hold-down roller 30 but because it is not scored and is rather resilient it does not conform precisely to the corners of the trough but rather curves from the bottom of the trough to the walls 28, leaving the spaces 32, as shown in FIG. 2.

Figure 3:
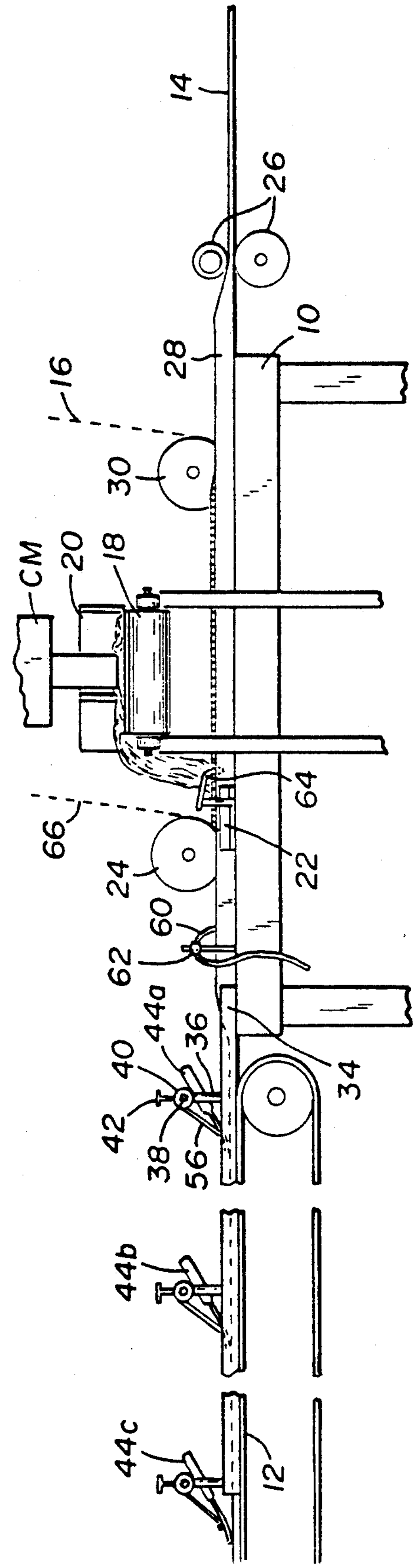
FIG. 3 is a diagrammatic side view, partially broken away, of another embodiment of the inventive apparatus.

The longitudinal edger rails 34 extend downstream from the forming table 10 in slidable contact with the conveyor belt 12. The posts 36 are mounted on the rails 34 and the rods 38 are slidably mounted within the rings 40, as shown more clearly in FIG. 4. The distance between the rails 34 is adjusted and maintained by sliding the rings 40 along the rods 38 and tightening the set screws 42 at the selected points. As shown in FIG. 3, several sets of the posts 36 and the rods 38 are spaced apart along the rails 34 to prevent lateral movement of the rails independently of each other and thus assure a constant cement board width. The rails may move laterally in tandem in response to occasional shifting of the conveyor belt as it travels around the drive and take-up pulleys but, since the distance between them is constant, the upright walls 28 of the carrier sheet are not allowed to fall away and let the concrete mix spread haphazardly. The edger rails 34 are continuous lengths of a lightweight material such as aluminum and, in a preferred embodiment of this invention, the rails are hollow in order to further lighten their weight and allow them to, in effect, float on the conveyor belt with negligible wear. The posts and rods are also made of lightweight material to achieve that effect. Preferably, the rails are rectangular in cross-section and about 1.5 inches wide and about 0.75 inch thick, their weight being distributed across their width as the conveyor belt glides beneath them.

Figure 4:
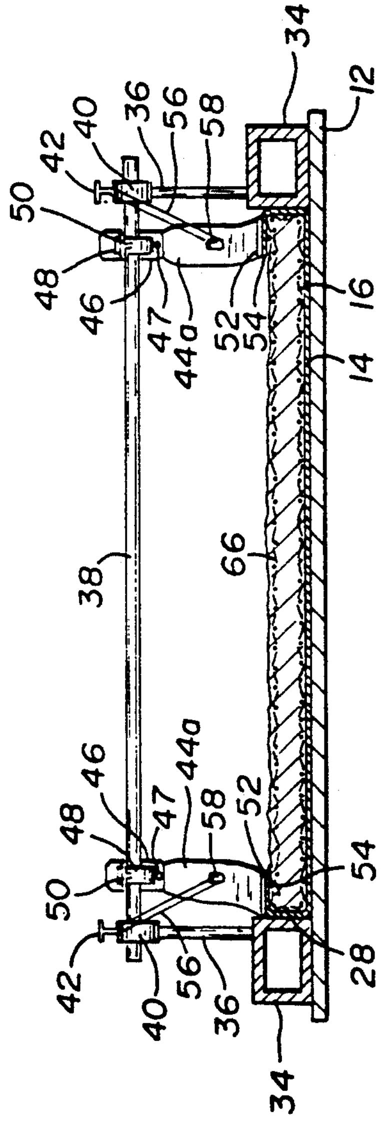
FIG. 4 is a sectional view of the production line of FIG. 5, taken along the line 4—4.
Figure 5:
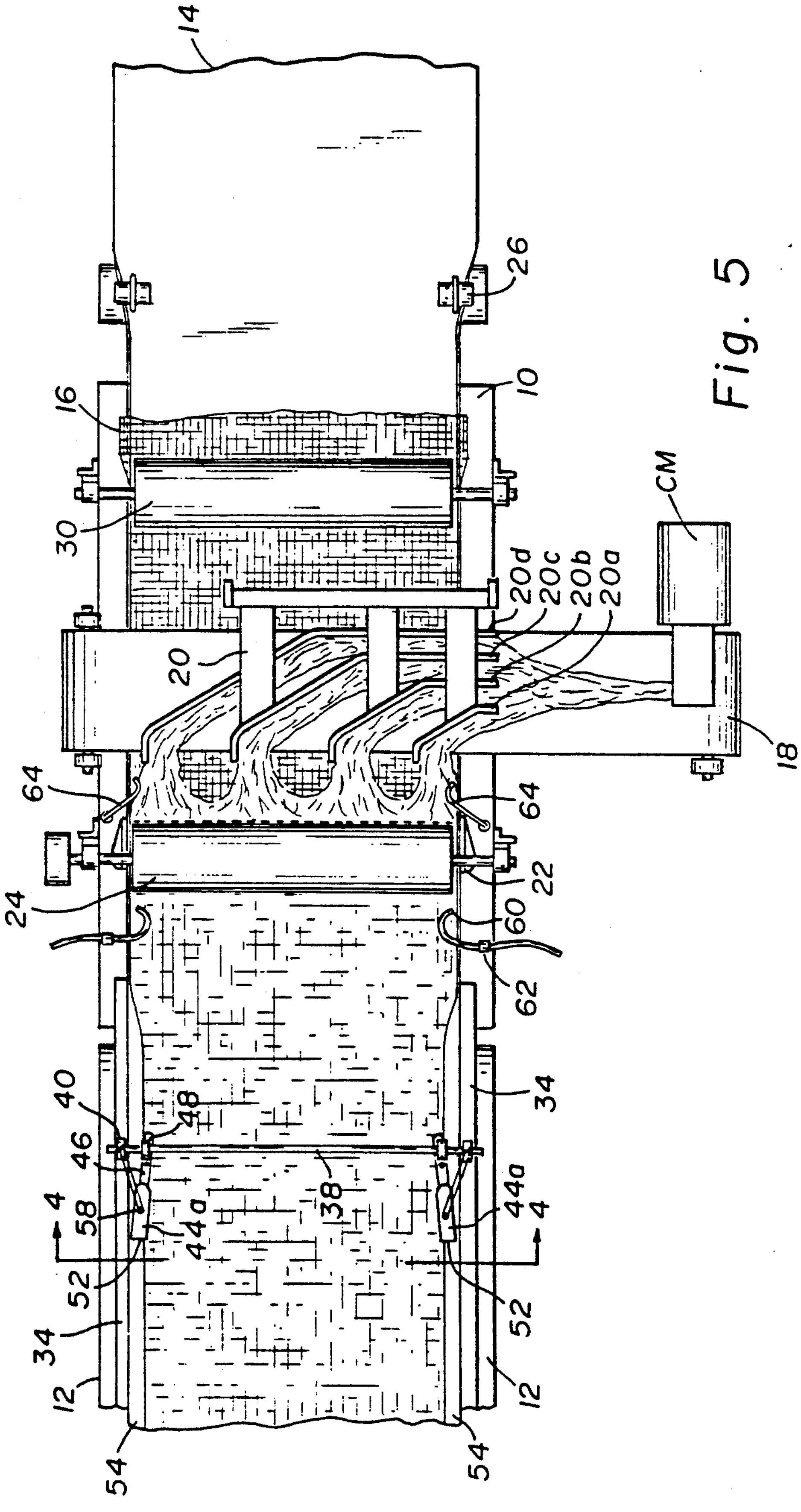
FIG. 5 is a diagrammatic plan view of the production line of FIG. 3.

The spatulas 44 are mounted in pairs on the rods 38, as shown in detail in FIG. 4. Only three pairs of spatulas are shown in FIG. 3 but it is to be understood that as many as eight or more pairs of spatulas may be spaced apart downstream from the roller 24. The first pair of spatulas are preferably spaced from about four to about eight feet (1.2 to 2.5 meters) downstream from said roller and the space between consecutive pairs is preferably from about five to about ten feet (1.5 to 3 meters). Each spatula is pivotably fastened to a bracket 46 by a screw 47. The bracket extends tangentially from a collar 48 which in turn is rotatably mounted on a rod 38 inboard from a ring 40 and is locked in place by a set screw 50. The blade tip 52 of each spatula is preferably cut back at an angle of about 20° or less as shown in FIG. 5 so that each spatula may be canted toward the respective rail 34 by pivoting it on the bracket 46 and thus cause its tip 52 to be aligned at a substantially right angle with its respective rail. The outboard edge of the tip is thus caused to press down more heavily than the inboard edge on the folded strip 54 of the carrier sheet 14. In this manner, the margins of the cement are tapered to the desired degree. An angle of from about 5° to about 20° is preferred, 5° being particularly preferred. In the event that a spatula having a squared-off tip is used or that further biasing is needed, a rubber band 56 or other restraining means connects a peg 58 on the spatula blade to a set screw 42 as shown or to a ring 40. The spatula blade is made of a resilient material such as a chrome plated spring steel which is not readily corroded by contact with a hydraulic cement mixture. The blade is thin, e.g. about 20 gauge, and is about nine to twelve inches (23 to 30 cm) long. The folded strip 54 is preferably about 1.5 inches wide and the spatula blade may be as wide as the strip 54 but no wider because scraping of the concrete mix adjacent the strip is to be avoided.

An alternative means for mounting the spatulas on the rails 34 is a carrier having a foot insertable in the hollow end of a rail 34, an upright leg attached at an angle to the foot and extending above the horizontal plane of the foot, and a shaft attached to the leg at a right angle to the vertical plane passing through the foot so as to extend inboard when the foot is inserted in the rail. The first pair of spatula carriers are mountable in the upstream end of hollow rails 34; succeeding pairs may be inserted in hollow rail segments mounted atop the rails 34. Individual carriers may be right-handed or left-handed or they may be made reversible by making the feet bidirectional. The spatulas are mounted on the carrier shafts in the same way as on the rods 38.

Also shown in FIGS. 1, 3, and 5 are the air jets 60 connected to the valves 62 which are mounted on the forming table 10 and are connected to a source of compressed air. In FIGS. 3 and 5, the fingers 64, used only when it is desired to fold the margins of the lower mesh 16 to lie under the top mesh 66, are mounted on the table 10 and extend in over the guide flanges 22 to urge the upstanding margins of the bottom mesh 16 inward and downward so that said margins may be further bent down as they pass under the roller 24.

Figure 6:
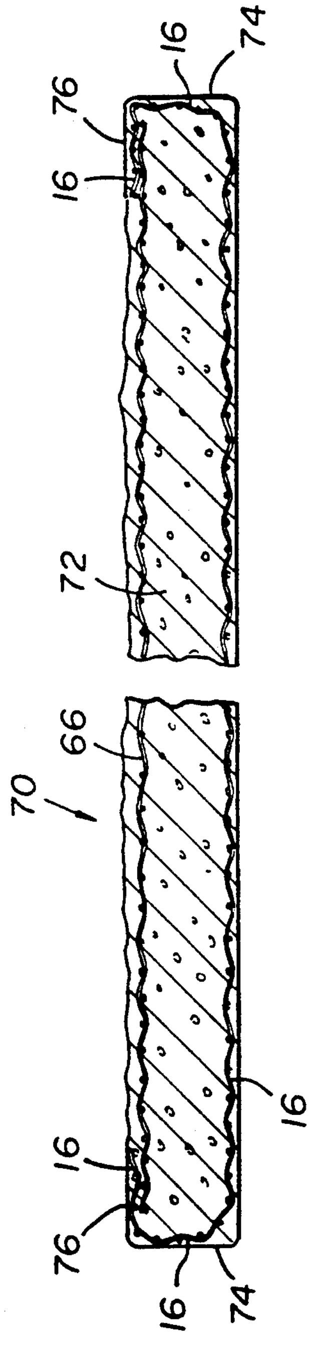
FIG. 6 is a cross-section of the cement board of this invention.

The finished cement board 70 is shown in cross-section in FIG. 6 to reveal the core 72 which extends through the bottom mesh 16 even as said mesh bends up and around to overlap the top mesh 66 which lies just beneath the upper surface of the board. Thus, the concrete mix in the cement board is an autogenous binder for the lapping meshes 16 and 66 at the margins 76 of the upper surface of the board. As shown, the edges 74 and the margins 76 are smooth because of the smoothing effect of the carrier sheet strips 54 being pressed onto the mix by the rails 34 and the spatulas 44. The smooth margins 76 are preferred when the cement boards are fastened side-by-side on a partition and joint tape is adhesively applied to the margins before joint compound is applied. If it is desired that the entire field of the upper surface of the board be nubby, the strips 54 may be peeled off, along creases made by the spatulas, before final set of the concrete mix has occurred. The strips 54 will then remove a thin layer of the mix from the margins and leave a roughened surface. If the creaser wheels 26 are used, all but the bottom of the carrier sheet 14 may be removed before or after final set.

Although FIG. 6 shows the folded bottom mesh 16 overlying the woven top mesh 66 along the margins, the board of this invention may be made so that the mesh 16 lies under the top mesh 66 when the fingers 64 are employed to bend the upstanding portions of the mesh 16 inward and downward before they reach the roller 24.

Moreover, although the continuous manufacture of the cement board having the top mesh 66 is further described as follows, it will be understood that said mesh is not essential to this invention.

The creased carrier sheet 14 and the woven mesh 16 are passed manually beneath the distribution belt 18, between the flanges 22, under the screeding roller 24 and onto the conveyor belt 12 so that when the conveyor drive means (conventional, not shown) is actuated, a mesh lined trough having the upright walls 28 is towed in the machine direction indicated by the arrow MD. Concrete mix is fed onto the belt 18 from a continuous mixer shown as the box CM and is scraped onto the mesh 16 by the plow blades 20*a, b, c,* and *d.* The streams of concrete mix thus formed spread and merge as the roller 24 dams their movement. The spreading mix penetrates the curved mesh 16 and moves into the spaces 32. The top mesh 66 is dragged between the roller 24 and the dammed mix while the roller rotates counter to the MD. The roller constantly picks up a coat of concrete mix which squeezes through the voids of the woven top mesh 66 at the nip and then it wipes the mix onto the obverse face of the top mesh 66 to aid in the impregnation thereof. If the top mesh is slightly narrower than the cylindrical roller 24, a ring of the concrete mix clings to the unwiped edges of the cylinder. Said mix is thrown by centrifugal force alongside the upright walls 28 of the paper trough. If the walls 28 show a tendency to bend over prematurely, they may be held upright by the force of air directed against the walls by the air jets 60. Unwanted splatters of the mix on the walls 28 may be cleaned off by such air, also.

As the trough of concrete mix approaches the first pair of flexed spatulas 44*a*, the margins of the mesh 16 and the walls 28 of the trough are tucked under the spatulas 44*a* to initiate the folding over of the continuously approaching carrier sheet 14 and mesh 16. It is preferred to fold the bottom mesh over onto the concrete mix which already covers the top mesh 66 and use the pressure of the flexed spatula blades to press the strips 54 down onto the folded over mesh 16 to urge the woven glass fibers into the mix. Folding of the margins of the mesh 16 onto the body of the mix before the top mesh 66 is applied is another way to produce the reinforced-edge cement board of this invention. To do so, the fingers 64 of FIGS. 3 and 5 are placed so as to urge the margins of the mesh 16 inward and downward and the concrete mix ringing the edges of the roller 24 is thrown onto the bent-over margins. The weight of the mix further bends the margins down before the top mesh 66 is applied. The folded-over mesh 16 is thus embedded near the upper surface of the board along with the mesh 66 as they emerge from under the roller 24 but the mesh 16 still tends to rise up because of its resilience; the spatulas 44 are still necessary to press the margins of the mesh 16 down as the concrete mix sets.

The pressure of the flexed spatula blades on the strips 54 is varied according to the consistency of the concrete mix and the stiffness of the mesh. A range of from about 1 to about 4 psi (gauge) is preferred. The smallest pressure is applied by the first pair of spatulas 44*a* and the pressure is increased in increments as the strips 54 pass under the succeeding pairs of flexed spatulas 44*b*, 44*c*, etc.

The placing of the spatulas 44 downstream from the mixer CM is determined by the line speed at which the board is manufactured and the rate of hydration of the cement which, in turn, is a function the cement formulation and the temperature of the concrete mix. A rapid hardening, high early strength cement such as that described in the aforementioned U.S. Pat. No. 4,488,909 is preferred in the production of the cement board of this invention. The high temperature concrete mix described in the '909 patent is preferred, also. Although U.S. Pat. No. 4,504,335 describes the mix as a relatively stiff, immobile mortar, a particularly preferred mix for the purposes of this invention has a consistency such that a dimple made in the mix just after it has been deposited on the belt 12 will disappear by the time the mix arrives at the roller 24, i.e., about 4 seconds. It has been found that when such a self-leveling mortar is used the bottom mesh 16 may be well embedded in the mortar even though the means for creating a gap between the carrier sheet and the bottom mesh described in U.S. Pat. No. 4,450,022 is not used. An example of such a mortar is one in which the cement powder consists of 68.1% Type III portland cement, 17.79% high alumina cement, 5.69% landplaster, 0.57% hydrated lime, and 7.84% fly ash. A lower cost cement powder may be used if a fine high alumina cement (about 6000 $cm^2/g$ Blaine) is employed at about a 12.5% level with concomitant changes in the amounts of the other cementitious solids for an optimized formulation. The mortar also contains blast furnace slag in an amount equal to, on a dried basis, the weight of the cement powder. The self-leveling property of the mortar is enhanced and prolonged by one part of Lomar D superplasticizer and about 0.5 part of an 8% aqueous solution of citric acid per hundred parts by weight of the cement powder. The water to cement powder ratio is about 0.35 by weight, including the water introduced with wet slag, the superplasticizer and citric acid solution. Foam and expanded poly-styrene beads are also introduced into the continuous mixer along with the other solids and liquids so as to make a cement board having a density of from about 74 to about 80 pounds per cubic foot.

The embedding of the folded-over mesh 16 must, of course, take place before the initial set of the concrete has occurred but the mix cannot be so soupy at the first spatula pair that the mesh will rise up again after passing under a spatula. A convenient and satisfactory way to measure the extent of hydration of the cement at various points along the line is to place a sample from the mixer in a calorimeter connected to a recording chart so as to plot the rise in temperature against elapsed time. The total temperature rise up to the equilibrium temperature is noted. The distance between the roller 24 and the selected spatula position is measured and that distance is divided by the line speed to give the travel time for the concrete mix from the roller 24 to the selected position. A time factor for the travel of the mix from the mixer CM to the roller 24 must be added. This factor can be determined by measuring the travel time of a spot of pigment such as iron oxide placed in the mix at the mouth of the mixer. A plot of the age of the concrete mix on the time-temperature curve gives the temperature rise at the selected spatula position. The ratio of the incremental temperature rise against the total temperature rise is an indication of the extent of hydration at the selected position. For example, a concrete mix prepared according to the '909 patent reached the equilibrium temperature in 12.5 minutes, which is within the range of set time disclosed in said patent, and the total temperature rise was 27° F. (from 103° F. to 130° F.). At a line speed of 32 feet per minute (1 foot=0.3 meter), the extent of hydration, as a percentage of the hydration which has occurred at the equilibrium temperature, at the locations of four pairs of the spatulas 44, spaced at 7 feet, 17 feet, 26 feet, and 35 feet from the roller 24, was 15%, 22%, 26%, and 32%, respectively, The travel time for the concrete mix from the mixer to the roller 24 was estimated to be about 12 seconds. The spatulas may be used to press the mesh 16 into the upper longitudinal margins of the concrete ribbon and to form, in co-operation with the edger rails 34, smooth reinforced edges along the ribbon while the extent of hydration, as so expressed, is in the range of from about 10 to about 35%. It is preferable that the spatulas 44a are placed to press down lightly upon the strips 54 as the hydration reaches a stage equal to from about 10 to about 18% of the hydration which will have occurred at the equilibrium temperature.

The woven mesh is preferably composed of glass fibers but nylon, metal, and aramid resin fibers may also be used. The mesh size and the fiber diameter are selected according to the strength desired in the board and the size of the aggregate in the concrete mix. A mesh having a thread count per inch of from 4×4 to 18×14 or 10×20 is acceptable for most purposes. A mesh having a tighter weave along the margins may be used to further strengthen the edges and margins of the board.

In the manufacture of a 36 inch (1 inch=2.54 cm) wide×½ inch thick cement board of this invention, for example, the mesh 16 was 38.5 inches wide, the mesh 66 was 35.75 inches wide, the thread count of each was 10×10, and the carrier sheet 14 was 40 inches wide. The edge of the mesh 66 was inset ⅛ inch from each longitudinal edge of the board and there was a ⅞ inch overlap of the folded-over portion of the mesh 16 above the mesh 66 at each longitudinal margin of the board.

The cement board of this invention is an improved tile backer board for the construction of bathrooms, particularly shower enclosures, locker rooms, swimming pool rooms and other units which are subject to high humidity and splashing water. Reinforcement of the edges and margins of board makes attachment of the board to the framework of a room with nails or screws more secure. Use of the edge-reinforced boards in the construction of exterior curtain walls is also contemplated.

Ten samples of ½ inch thick cement board of this invention were tested to learn how much force would be necessary to pull a nail laterally through the reinforced edge of the board. To do so, a ⅛ inch hole centered ⅜ inch from the edge of the board is drilled in the margin of the board and the board is clamped in place. A ⅛ inch diameter pin simulating a nail is passed through the hole and pulled laterally by a Tinius-Olsen machine attached to both ends of the pin and the force necessary to pull the pin laterally through the edge of the board is recorded. The average force required in the ten tests was 96 pounds (427 newtons) When the same test was performed on glass fiber reinforced cement boards of approximately the same age but not having the reinforced edges, the force required to pull the pin out laterally was generally on the order of about 40 pounds (178 newtons).

The invention has thus far been described in terms of a wallboard having a hydraulic cementitious core. A wallboard having a non-hydraulic but, nevertheless, hydrated cementitious core is also regarded as part of the subject matter of this invention. Thus, a gypsum wallboard without the usual paper covering but strengthened by a woven mesh of reinforcing fibers embedded in the core at the top, bottom and longitudinal edge surfaces may be made by substituting a slurry of calcium sulfate hemihydrate for the concrete mix in the process described above.

The subject matter claimed is:

1. A method for making a cementitious wallboard having reinforced longitudinal edges which comprises:

continuously towing on an endless conveyor belt an indefinitely long, non-adherent carrier sheet over a forming table which is upstream from the conveyor belt, said sheet being wider than the cement board being made;

forming a continuous trough by bending outer portions of the sheet upright;

continuously laying a first indefinitely long mesh of glass fibers into the trough, the mesh being wider than the trough;

continuously depositing a hydrating cementitious mix on the mesh and distributing the mix laterally to fill the trough to a substantially uniform depth;

continuously submerging a second indefinitely long mesh of glass fibers beneath the surface of the mix;

towing the filled trough in an abutting relationship with and between a pair of fixedly spaced, indefinitely long edger rails which rest longitudinally on the conveyor belt in slidable engagement therewith;

folding upright portions of the carrier sheet and outer portions of the first mesh inward and over the mix and overlapping the margins of the second mesh; and pressing the folded-over carrier sheet down onto the surface of the mix whereby the outer portions of the first mesh are pressed into the mix after the second mesh has been submerged into the mix.

2. The method of claim 1 wherein the folded-over carrier sheet and the first mesh are pressed down under a pressure which increased as the filled trough travels downstream.

3. The method of claim 2 wherein the mix is concrete and the pressure is from about 1 psi to about 4 psi.

4. The method of claim 1 wherein the mix is concrete and the extent of hydration of the mix during the pressing step is from about 10% to about 35% of the hydration which will have occurred at the maximum temperature of the hydrating mix.

5. The method of claim 1 wherein the mix is concrete and the pressing is initiated when the mix has hydrated to an extent equal to from about 10% to about 18% of the hydration which will have occurred at the maximum temperature of the hydrating mix.

6. The method of claim 1 wherein the first mesh is woven.

7. The method of claim 1 wherein both the first mesh and the second mesh are woven.

8. A method for making a cementitious wallboard having reinforced longitudinal edges which comprises:

continuously towing on an endless conveyor belt an indefinitely long, non-adherent carrier sheet over a forming table which is upstream from the conveyor belt, said sheet being wider than the cement board being made;

forming a continuous trough by bending outer portions of the sheet upright;

continuously laying a first indefinitely long mesh of glass fibers into the trough the mesh being wider than the trough;

continuously depositing a hydrating cementitious mix on the mesh and distributing the mix laterally to fill the trough to a substantially uniform depth;

towing the filled trough in an abutting relationship with and between a pair of fixedly spaced apart, indefinitely long edger rails which rest longitudinally on the conveyor belt in slidable engagement therewith;

folding upright portions of the carrier sheet and outer portions of the first mesh inward and over the mix;

pressing the folded-over carrier sheet down onto the surface of the mix and the first mesh into the mix; and continuously submerging a second indefinitely long mesh of glass fibers beneath the surface of the mix whereby the outer portions of the first mesh are folded into the mix before the second mesh is submerged in the mix.

9. The method of claim 8 wherein the folded-over carrier sheet and the first mesh are pressed down under a pressure which increases as the filled trough travels downstream.

10. The method of claim 9 wherein the mix is concrete and the pressure is from about 1 psi to about 4 psi.

11. The method of claim 8 wherein the mix is conrete and the extent of hydration of the mix during the pressing of the first mesh is from about 10% to about 35% of the hydration which will have occurred at the maximum temperature of the hydrating mix.

12. The method of claim 8 wherein the mix is concrete and the pressing of the first mesh is initiated when the mix has hydrated to an extend equal to from about 10% to abut 18% of the hydration which will have occurred at the maximum temperature of the hydrating mixture.

13. The method of claim 8 wherein the first mesh is woven.

14. The method of claim 8 wherein both the first mesh and the second mesh are woven.

* * * * *